United States Patent [19]

Becker et al.

[11] Patent Number: 4,855,342

[45] Date of Patent: Aug. 8, 1989

[54] COATING MATERIAL AND ITS USE AS PRIMER AND EXTENDER

[75] Inventors: Heinz D. Becker, Bonn; Klaus Bederke, Sprockhovel; Ralf Dahm, Wermelskirchen; Hermann Kerber, Wuppertal; Fritz Sadowski, Brauweiler bei Koln; Werner Stephan, Wuppertal, all of Fed. Rep. of Germany

[73] Assignee: Herberts Gesellschaft, Wuupertal, Fed. Rep. of Germany

[21] Appl. No.: 122,903

[22] Filed: Nov. 19, 1987

[30] Foreign Application Priority Data

Nov. 25, 1986 [DE] Fed. Rep. of Germany ....... 3640243

[51] Int. Cl.$^4$ .......................... C09D 3/72; C09D 3/76; C09D 3/81; B05D 7/26
[52] U.S. Cl. ......................................... 524/31; 524/32
[58] Field of Search .................................. 524/31, 32

[56] References Cited

U.S. PATENT DOCUMENTS 4,177,172 12/1979 Traenckner et al. ................. 524/41

FOREIGN PATENT DOCUMENTS 1515868 6/1978 United Kingdom .

*Primary Examiner*—John Kight
*Assistant Examiner*—Nathan M. Nutter
*Attorney, Agent, or Firm*—Michael A. Cornman

[57] ABSTRACT

Previous coating materials lead to the formation of bubbles at high layer thickness and when drying by heating. The new coating materials are intended to be bubble-free when dried at higher layer thicknesses.

Aside from pigments and/or extenders, the coating material contains solvents and, if necessary, conventional paint auxiliaries in a vehicle mixture, comprising essentially 60-75% by weight of a hydroxy-functional copolymer, 1-5% by weight of an ester-soluble nitrocellulose and 25-35% by weight of difunctional or multifunctional polyisocyanate. It can be cured without forming bubbles even when applied in thick layers.

Use as primer and filler.

4 Claims, No Drawings

COATING MATERIAL AND ITS USE AS PRIMER AND EXTENDER

BACKGROUND OF THE INVENTION

The invention relates to a coating material, which contains a vehicle, which is a mixture of an ester-soluble nitrocellulose, a hydroxy-functional copolymer and a lacquer polyisocyanate, aside from pigments and/or extenders, solvents and optionally conventional lacquer auxiliaries. The coating material of the invention is particularly suitable for the production of primers as well as of extenders, especially for the motor vehicle sector, since it is possible to achieve layer thickness of up to 500 μm with the coating material of the invention.

Coating materials based on polyhydroxyl polyacrylate resins and lacquer polyisocyanates are well known. For example, a coating material is described in the German Auslegeschrift No. 2,460,329, which is suitable for an automobile finishing coat and which contains a vehicle based on an acrylate resin, which has copolymerized units of 10 to 50 parts by weight of a hydroxyalkyl ester of (meth)acrylic acid. 0 to 80 parts by weight of styrene or styrene derivatives, 10 to 90 parts by weight of a (meth)acrylate ester with up to 12 carbon atoms in the alcohol group and 0 to 50 parts by weight of an $\alpha,\beta$ of a monounsaturated olefinic mono- or dicarboxylic acid. Such acrylate resins, together with lacquer polyisocyanates and cellulose derivatives, are used as leveling agents. However, it has turned out that such coating materials in actual fact, as stated in the German Auslegeschrift No. 2,460,329, can only be used for finishing coats, since they are not suitable for forming thicker layers. For example, it is not possible with the known coating materials described above to dry layers, which are more than 150 μm thick, with radiators, since bubbles are formed and the coatings, so obtained, are therefore not bubble-free.

A primer, primer fillers or fillers must meet various requirements. It should be appliable without problems. For example, it should level out well, even when applied on vertical surfaces or at different viscosities. Moreover, good surface drying, through-drying and sandability (dry and in the wet state) must be assured. Furthermore, the solvent resistance should be such that, when sprayed with a two-component finishing coat, a paint coat in good condition is guaranteed. In the case of filler, it should be possible to obtain a coating up to 300 μm or even 500 μm thick, without encountering drying problems due to the tendency to form bubbles.

Any reference herein to a "primer" coat intends to include also reference to a "filler" which refers to a coating layer in a multi-layer coating, which is applied over the primer coating, usually to promote achievement of a smooth surface which is ultimately obtained by an additional coating, such as a finish coat.

SUMMARY OF THE PRESENT INVENTION

It was therefore an object of the invention to provide coating materials, which satisfy the above requirements, which are suitable for the preparation of primers and as fillers and which make reliable and brief air, oven and radiation drying possible, especially in the case of thick layers.

This objective is accomplished by the coating materials of the claims, which form the object of the invention.

It has turned out that the coating materials of the invention can be applied in thick layers of up to 300, 400 or 500 μm and yet not show any tendency to form bubbles when dried by radiators. It thus becomes possible to prepare a high solids product, which dries easily and, because of the low solvent content, has a low ecological impact. The coating layers obtained adhere well to different substrates, for example, to cleaned, degreased and sanded sheet iron, intact, sanded, old coatings of paint, spare-part primers and filler sites. They can readily be sanded wet.

DETAILED DESCRIPTION OF INVENTION

The copolymers (component A), used in the coating materials of the invention, can be prepared by polymerization according to the usual methods, for example, by solventless, solution or bead polymerization. The different polymerization methods are well known and described in Houben-Weyl, Methoden der Organischen Chemie (Methods of Organic Chemistry), 4th edition, volume 14/1, pages 24–255 (1961).

Solution polymerization is the preferred method for the preparation of the copolymer. With this method, the solvent is added to the reactor and heated to the boiling temperature, whereupon the monomer/initiator mixture is metered in continuously within a particular time.

The polymerization is carried out temperatures between 60° C. and 160° C., preferably at 80° C. to 140° C.

The polymerization reaction is started with known polymerization initiators. Suitable initiators are per compounds and azo compounds, which decompose thermally into free radicals in a first order reaction. The type and amount of initiator is selected so that the available free radical concentration is as constant as possible at the polymerization temperature, while the monomer/initiator mixture is being added. Examples of initiators, preferably used for the polymerization are:

dialkyl peroxides, such as di-t-butyl peroxide, dicumyl peroxide.

diacyl peroxides, such as dibenzoyl peroxide, dilauroyl peroxide.

hydroperoxides, such as cumol hydroperoxide, t-butyl hydroperoxide.

peresters, such as t-butyl perbenzoate, t-butyl perpivalate, t-butyl per-3,5,5-trimethylhexanoate, t-butyl per-2-ethylhexanoate.

peroxydicarbonate, such as d-2-ethylhexyl peroxydicarbonate, dicyclohexyl peroxydicarbonate.

perketals, such as 1,1-bis-(t-butylperoxy)-3,5,5-trimethylcyclohexane, 1,1-bis-(t-butylperoxy)-cyclohexane.

ketone peroxides, such as cyclohexanone peroxides, ethyl isobutyl ketone peroxide azo compounds, such as 2,2'-azo-bis(2,4-dimethylvaleronitrile), 2,2'-azo-bis(2-methylbutyronitrile), 1,1'-azo-bis-cyclohexanecarbonitrile, azo-bis-isobutyronitrile.

The polymerization initiators, especially the peresters, are generally added in an amount of 0.1 to 3% by weight, based on the amount of monomer originally weighed out.

As solvents, which can be used for the solution polymerization, those organic solvents are, for example, suitable, which can then later on also be used in the finished coating materials. Examples of such solvents are:

glycol ethers, such as ethylene glycol dimethyl ether, glycol ether esters, such ethyl glycol acetate, butyl glycol acetate, 3-methoxy-n-butyl acetate, butyl diglycol acetate, methoxy propyl acetate esters, such as butyl acetate, isobutyl acetate, amyl acetate, ketones, such as methyl ethyl ketone, methyl isobutyl ketone, diisobutyl ketone, cyclohexanone, isophorone, Aromatic hydrocarbons, such as zylene or Solvesso 100 (registered trademark) and aliphatic hydrocarbons, optionally blended with the above-named solvents, may also be used.

For the preparation of the copolymer, chain transfer agents may be used to control the molecular weight. Examples are mercaptans, thioglycolic esters and chlorinated hydrocarbons.

The polymerization conditions (reaction temperature, monomer mixture inflow time, solution concentration) are adjusted so that the copolymers produced have a number average molecular weight (determined by gel permeation chromatography using, for example, THE as solvent and polystyrene as calibrating substance) between 2,000 and 20,000.

The glass transition temperature of the copolymers, prepared pursuant to the invention, falls within the range of +20° C. to +80° C., calculated from the glass transition temperatures of the homopolymers of the individual monomers given in the literature (Fox equation; see, for example, Polymere Werkstoffe; Batzer 1985, page 307).

To improve the pigment wettability of the copolymers prepared pursuant to the invention, dicarboxylic acid anhydrides may be incorporated by esterification with the hydroxyl groups contained in the polymer chain. Examples of such dicarboxylic acid anhydrides are tetrahydrophthalic anhydride, hexahydrophthalic anhydride, phthalic anhydride and succinic anhydride. They are used preferably in an amount of 2 to 6% by weight, based on the monomer weight. Preferably, phthalic anhydride is used preferably in an amount of 2 to 6% by weight, based on the weight of the monomers.

For the preparation of the copolymers contained in the coating materials of the invention, styrene and/or styrene derivatives are used as component (A)(a). Styrene derivatives preferably are alkylated styrene, with one, two or three alkyl groups (preferably with 1 to 4 carbon atoms) in the αposition or attached to the ring. Examples are α-methylstyrene, o-, m- or p-methylstyrene and p-t-butylstyrene. They can be used as a mixture of one another and, optionally, as a mixture with styrene. Styrene is preferred.

The hydroxyalkyl esters of acrylic acid or methacrylic acid, used as component (A)(b), preferably have 4 to 6 carbon atoms in the hydroxyalkyl group. Examples of preferred hydroxyalkyl esters of acrylic acid or methacrylic acid are: 1,4-butanediol monoacrylate, 1,4-butanediol monomethacrylate, 1,2-butanediol monoacrylate, 1,2-butanediol monomethacrylate, 1,6-hexanediol monoacrylate, 1,6-hexanediol monomethacrylate, 1,4-butanediol monoacrylate and 1,4-butanediol monomethacrylate being especially preferred.

The usable (meth)acrylates (component (A)(c)) are, especially, the alkyl esters of acrylic acid or methacrylic acid with a glass transition temperature of the homopolymers of >40° C. Suitable examples are t-butyl acrylate, methyl methacrylate, ethyl methacrylate, isopropyl methacrylate, t-butyl methacrylate, cyclohexyl methacrylate, and trimethylcyclohexyl methacrylate. Methyl methacrylate and t-butyl acrylate are preferred.

The nitrocellulose (cellulose nitrate) used in the coating material of the invention as component (B), should be soluble in organic ester solvents. For example, nitrocellulose with a nitrogen content of 11.8% to 12.25% nitrogen is suitable for this purpose. Such a nitrocellulose is soluble in esters and practically insoluble in alcohols. It can, however, be blended to a large extent with alcohols and aromatic compounds. Ester solvents, in which the nitrocellulose, usable pursuant to the invention, is soluble, are, for example, those esters, which are suitable for the above solution polymerization for the preparation of component (A) and those, which may also be contained later on in the finished coating materials.

It is advantageous if the intrinsic viscosity of the nitrocellulose, expressed by the K value of H. Fikentscher (Cellulosechemie 13, page 58 (1932) falls in the range of 300 to 600 (measurement: 2 g of nitrocellulose in 100 mL of acetone at 25° C.).

Preferably, a nitrocellulose with a K value of 400, such as Collodiumwolle® E 400 B (Wolff Walsrode AG), is used.

For cross linking the inventive vehicle mixture of copolymer and estersoluble nitrocellulose, polyisocyanates (component C) are used. These polyisocyanates are typical polyisocyanates for paints or paint polyisocyanates, similar to those described in the literature, for example in the European Patent No. B1 00 68 383 (there, especially on page 2, line 57 to page 3, line 26).

The proportion of polyisocyanate cross linking agent is selected so that there are 0.5 to 2 isocyanate groups per hydroxyl group of the vehicle mixture. Excess isocyanate groups can be reacted with moisture and contribute to the cross linking.

Some examples of suitable polyisocyanates are listed in the following: aliphatic, cycloaliphatic and aromatic polyisocyanates such as hexamethylene diisocyanate, trimethylhexamethylene diisocyanate, isophorone diisocyanate, 4,4'-diisocyanato-dicyclohexylmethane, 2,4-toluylene diisocyanate, o-, m- and p-xylene diisocyanate, 4,4'-diisocyanatodiphenylmethane; polyisocyanates capped with compounds having CH, NH or OH active hydrogens; polyisocyanates containing biuret, alophanate, urethane or isocyanurate groups. Examples of such polyisocyanates are a reaction product from 3 moles of hexamethylene diisocyanate and 1 mole of water, containing biuret groups and having an NCO content of approx. 22% (corresponding to the commercial Bayer AG product Desmodur (N ®); an isocyanurate group-containing polyisocyanate, which is prepared by trimerizing 3 moles of hexamethylene diisocyanate and has an NCO content of about 21.5% (correspond to the Bayer AG commercial product Desmodur N 3390 ®); or urethane group-containing polyisocyanates, which represent reaction products of 3 moles of toluylene diisocyanate and 1 mole of trimethylolpropane with an NCO content of about 17.5% (corresponding to the Bayer AG commercial product Desmodur L(R)).

Preferably, Desmodur N ® and Desmodur N 3990 ® are used.

For the preparation of the coating materials of the invention, the individual components are mixed together and homogenized in the usual manner or milled. For example, the hydroxy-functional copolymer (component A) may first of all be mixed with any pigments and/or extenders, as well as with any conventional paint auxiliaries and solvents that are to be present, after which a dispersion is formed and the nitrocellulose (component B) is added in the form of a solution, whereupon milling step follows. After that, the polyisocyanate (component C) may be added. It is also possible to store the polyisocyanate (component C) separately in the form of a solution and to add it to the remaining premixed components only immediately before the coating material is used.

Suitable as solvents for the coating materials of the invention are, for example, the solvents described above for the solution polymerization to prepare the hydroxy-functional copolymer (component A). The amount of solvent used depends on the desired viscosity of the finished coating material.

The normal pigments may be added to the coating materials of the invention. The usual inorganic and/or organic pigments may be used. These pigments may serve as color pigments or also as corrosion protection pigments. Examples of usable color pigments are black iron oxide, yellow iron oxide and titanium dioxide. Zinc phosphate is an example of a corrosion protection pigment.

The coating materials of the invention may also contain extenders. These extenders are the normal extenders used in coating materials and affect, for example, the adhesive strength, the elasticity, the drying, the sandability and the film hardness of coatings produced from the materials.

Examples of such extenders are silicic acid or silicon dioxide (for example, to improve the adhesion, the film hardness and the solvent emission and to affect the sandability), aluminum silicate (for example, to improve the sandability), magnesium silicate (for example, to improve the adhesion) and barium sulfate (for example, to improve the film hardness).

The ratio of solids and/or pigments to vehicle (on a solids basis by weight) preferably is 70-80 to 30-20. The auxiliaries, normally used in paint technology, may also be added to the coating materials of the invention. Examples of these are thixotropic agents, such as montmorillonite or pyrogenic silicon dioxide. Further examples are organic metal salts, such tin dibutyl laurate and zinc naphthenate. Such catalysts promote through drying and thus lead more rapidly to sandability of the coating obtained. Further examples, normally used in paint technology, are wetting agents, such as ionic and nonionic wetting agents, anticorrosive agents, etc.

The coating materials of the invention are suitable for forming coatings on substrates that are very different. Such substrates are, for example, metal, wood, ceramic and plastic. They are especially suitable for the motor vehicle industry as well as in other branches of industry for coating purposes in mass production, as well as in the repair area. They are particularly suitable for repairing damage to the paint coating of motor vehicles, especially passenger cars.

They may be applied on the substrate as such or on conventional primer. They are especially suitable as fillers particularly as primer fillers, because they make it possible to form thick layers of up to 300, 400 or even 500 μm. In the trade, they are used especially as 2-component materials, that is, the solution of component C is added, preferably immediately before use, to the dispersion of components A and B, which optionally contains additives.

The coating materials of the invention may be applied in various ways, for example, by spraying (such as compressed air spraying), brushing or by means of a spatula.

Coatings, prepared from the inventive coating materials, dry easily and reliably cure throughout even in thick layers. They are suitable for curing with, for example, infrared radiation without the formation of any bubbles.

The present invention thus makes available a coating material, which may have a high solids content or a relatively low solvent content. It therefore has a particularly low ecological impact. Because of the low tendency to form bubbles, it dries easily and cures throughout even in thick layers. It adheres well to different substrates and can therefore be used particularly well in the motor vehicle repair sector (for example, extender spots of polyethylene can be covered and, after drying and sanding, coated with the usual finishing coats). The coating materials of the invention have an exceptionally high extender effect and can be sanded wet.

EXAMPLES 1 to 4 AND COMPARISON EXPERIMENT (PREPARATION OF COMPONENT A)

Component I (the quantities are given in Table 1) is added to a 4 L 3-neck, standard taper joint flask, equipped with stirrer, contact thermometer, ball-shaped condenser and dropping funnel and heated with stirring to 124° C., the reflux condenser being switched on.

Component II (monomer mixture + initiator) is added continuously to the flask from a dropping funnel over a period of 5 hours. At the end of the addition, the temperature rises to 126° C. After the addition is completed, the dropping funnel is rinsed with component III, which is added to the reaction mixture.

Subsequently, the reaction mixture is cooled to 110° C., component IV is added and the temperature is raised once again to the refluxing temperature.

The batch is polymerized out for 5 hours at 124° to 126° C., so that the conversion is better than 99%.

The polymer is then cooled to 60° C. and cooled with component V.

TABLE 1

| | | Examples: | | | | |
| --- | --- | --- | --- | --- | --- | --- |
| | | 1 | 2 | 3 | 4 | Comp. |
| Component | | | | | | |
| I | butyl acetate | 300 | 720 | 720 | 720 | — |
| | xylene | 420 | — | — | — | 360 |
| II | styrene | 440 | 440 | 440 | 440 | 186 |
| | methyl methacrylate | — | 332 | 278 | 324 | 212 |
| | t-butyl acrylate | 320 | — | — | — | — |
| | 1,4-butanediol monoacrylate | 268 | 240 | — | 260 | — |
| | 1,4-butanediol monomethacrylate | — | — | 294 | — | — |
| | butyl methacrylate | — | — | — | — | 108 |
| | 2-ethylhexyl acrylate | — | — | — | — | 108 |
| | β-hydroxypropyl methacrylate | — | — | — | — | 412 |

TABLE 1-continued

|   |   | Examples: 1 | 2 | 3 | 4 | Comp. |
|---|---|---|---|---|---|---|
|   | t-butyl peroxyethylhexanoate | — | 20 | 20 | 20 | — |
|   | t-butyl peroxybenzoate | 26 | 20 | 20 | 20 | 30 |
| III | butyl acetate | — | 80 | 80 | 80 | — |
|   | xylene | 80 | — | — | — | 80 |
| IV | phthalic anhydride | 46 | 48 | 48 | 36 | 48 |
| V | butyl acetate | — | 100 | 100 | 100 | 280 |
|   | xylene | 100 | — | — | — | 176 |
| Total |   | 2000 | 2000 | 2000 | 2000 | 2000 |
| Characteristic Values |   |   |   |   |   |   |
| Solids (%): |   | 54.8 | 55.2 | 55.0 | 54.8 | 55.1 |
| Viscosity (mPa × s at 25° C.: |   | 640 | 925 | 1030 | 960 | 1890 |
| Acid number (based on solid resin): |   | 18.1 | 18.1 | 18.8 | 15.7 | 18.1 |
| OH number (based on solid resin): |   | 80 | 70 | 80 | 80 | 130 |

EXAMPLE 5

An example of a coating material of the invention, which is suitable as a 2-component, multi-area filler is described in the following:

Formulation (Parts by Weight):

21.00 hydroxy-functional copolymer (component A) from Example 1, 55% dissolved in xylene/butyl acetate (98/100)
6.50 methoxybutyl acetate (boiling point range: 160°-170° C.)
5.00 aromatic solvent mixture (Solvent Naphtha®, Shellsol A/®, Solvesso® (boiling point range: 160°-170° C.)
0.50 montmorillonite
2.50 silica
0.60 nonionic wetting agent
0.10 black iron oxide
1.00 yellow iron oxide
13.00 titanium dioxide
6.50 zinc phosphate
4.50 magnesium silicate
14.00 aluminum silicate
15.00 barium sulfate
2.50 nitrocellulose (component B, Collodiumwolle®, 20% dissolved in n-butanol/butyl acetate=11/69)
7.30 butyl acetate 98/100

MANUFACTURING METHOD

To a vessel, dried with butyl acetate, the component A, the solvent and the wetting agent were added and stirred. Montmorillonite and silicon dioxide were added with stirring and dispersed with a conventional disperser at 35°-40° C. Subsequently, the remaining components with the exception of component B were scattered in with stirring and then dispersed at 40°-50° C. After addition of the nitrocellulose solution, swelling was allowed to proceed for 12 hours, whereupon the product was milled to a particle size of 25-30 μm at 55°-60° C.

To improve the drying, 1,5 % of a 1 % solution of dibutyl tin dilaurate in xylene and 0.4 % of zinc naphtenate were added.

A coating component is obtained with a particle size of 25-30 μm, a flash point of >21° C., a density of 1.55 g/cc and a solids content of about 70%.

As second component of the coating material, the following curing agent was prepared; the quantities are given in parts by weight.

20.0 mixture of aromatics with a boiling point range of 160°-180° C. (Solvesso 100®)
8.0 xylene
14.0 ethyl glycol acetate
12.0 butyl acetate 98/100
46.0 polyisocyanate based on hexamethylene diisocyanate (Desmodur N® 75% xylene/ethyl glycol acetate)

The first component of the coating material, prepared above, was mixed in a ratio of 4:1 by volume with the above curing agent.

The product obtained contained 155 parts by weight of the component prepared first and 25 parts by weight of the curing agent.

The viscosity can be adjusted by diluting with a solvent mixture of the following composition (weight basis).

48.0 ethyl glycol acetate
23.0 butyl acetate 98/100
29.0 aromatics-xylene

The coating material, so obtained, was applied by spraying on sheet metal to form layers, one 300 μm the other 480 μm thick. In both cases, bubble-free coatings were obtained after curing with an IR radiator.

On repeating the above examples, but using the component A prepared in the above comparison example, bubble-free coatings could be obtained only for layers up to 200 μm thick.

We claim:

1. A prime coating material for forming primer coatings up to 500 μm thickness without appreciable bubble formation, comprising a vehicle which is a mixture of
   (a) from about 60% to about 75% by weight of a hydroxy functional copolymer having a hydroxyl number of from about 60 to about 90 mg KOH/g of the copolymer, said copolymer being made of
      (i) from about 36% to about 44% by weight of a styrene or a styrene derivative,
      (ii) from about 22% to about 28% by weight of a hydroxyalkyl ester of one or more of an acrylic and methacrylic acid, having 4 to 6 carbonates in the hydroxyalkyl group, and
      (iii) from about 26% to about 30% by weight or one more of an acrylate and methacrylate, the homopolymer of which has a glass transition temperature above 40° C.,
   (b) from about 1% to about 5% by weight of an ester-soluble nitrocellulose, and
   (c) from about 25% to about 35% by weight of a bi-functional or multifunctional polyisocyanate, wherein the sum of the components (a), (b), and (c); as well as that of (i), (ii), and (iii) is 100% in both cases.

2. The prime coating material of claim 1, further comprising one or more of a pigment, extender, solvent, and a lacquer auxiliary.

3. The prime coating material of claim 2, wherein said hydroxylalkyl ester of component (a) (i) comprises one or more of 1,4-butanediol monoacrylate, and 1,4-butanediol monomethacrylate.

4. The prime coating of claim 2, wherein said one or more of an acrylate and methacrylate of component (a) (III) comprises one or more of t-butylacrylate, and methylmethacrylate.

* * * * *